United States Patent [19]
Weinzierl et al.

[11] Patent Number: 5,766,489
[45] Date of Patent: Jun. 16, 1998

[54] PROCESS AND ARRANGEMENT FOR CONTINOUSLY CARRYING OUT PHOTOREACTIONS IN A LIQUID PHASE

[75] Inventors: Uwe Weinzierl; Guenter Kreisel, both of Jena; Kristina Dubnack, Bergholz-Rehbruecke, all of Germany

[73] Assignee: PTS Gesellschaft fuer Physikalisch-Technische Studien Jena mbH, Jena, Germany

[21] Appl. No.: 791,838

[22] Filed: Jan. 30, 1997

Related U.S. Application Data

[63] Continuation of Ser. No. 428,111, Apr. 28, 1995, abandoned.

[30] Foreign Application Priority Data

Sep. 13, 1993 [DE] Germany ............ 43 31 071.0

[51] Int. Cl.⁶ .................. C02F 1/32; C02F 1/72; C02F 1/48
[52] U.S. Cl. .......... 210/748; 210/763; 210/198.1; 210/205; 422/186.3
[58] Field of Search .......... 210/748, 758, 210/760, 763, 198.1, 205; 422/186.3

[56] References Cited

U.S. PATENT DOCUMENTS

| | | | |
|---|---|---|---|
| 1,602,835 | 10/1926 | Reifsnyder | 427/235 |
| 1,949,772 | 3/1934 | Allen | 118/215 |
| 2,364,683 | 12/1944 | Znamierowski | 118/254 |
| 3,105,554 | 10/1963 | McCall | 118/254 |
| 3,787,226 | 1/1974 | Iglehart et al. | 427/235 |
| 3,804,663 | 4/1974 | Clark | 427/512 |
| 4,135,958 | 1/1979 | Wood | 427/235 |
| 4,151,312 | 4/1979 | Comper | 427/235 |
| 4,397,890 | 8/1983 | Kinumoto et al. | 427/235 |
| 4,581,247 | 4/1986 | Wood | 427/230 |
| 4,602,974 | 7/1986 | Wood et al. | 427/230 |
| 4,716,053 | 12/1987 | Eskijian | 427/230 |
| 5,019,417 | 5/1991 | Northcutt | 118/254 |
| 5,320,877 | 6/1994 | Nakaue et al. | 427/242 |
| 5,348,764 | 9/1994 | Yokoshima | 427/230 |

FOREIGN PATENT DOCUMENTS

| | | | |
|---|---|---|---|
| 189787 | 6/1956 | Austria | 118/254 |
| 0444530A1 | 2/1997 | European Pat. Off. . | |
| 1141294 | 8/1957 | France | 118/254 |
| 23 63 114 | 7/1975 | Germany . | |
| 3422553 | 1/1986 | Germany . | |
| 581260 | 8/1958 | Italy | 118/215 |
| 51-010618 | 4/1976 | Japan | 427/512 |
| 98802767 | 6/1990 | Netherlands | 118/254 |
| 2150664 | 7/1985 | United Kingdom | 118/215 |

*Primary Examiner*—Neil McCarthy
*Attorney, Agent, or Firm*—McAulay Fisher Nissen Goldberg & Kiel, LLP

[57] ABSTRACT

A process and an arrangement for continuously carrying out photoreactions in cloudy, colored or UV-absorbing media. The object of providing a possibility for increasing the photon yield while continuously carrying out photoreactions in liquid substances is met in that the liquid dripping down a vertical inner wall of a pipe is wiped vertically to the dripping direction by means of distributor rollers which rotate on the rods of a cage-shaped rotor and is exposed proceeding from the center of the pipe by a rod-shaped photolamp. In this way, a liquid film of defined thickness is produced on the pipe wall and this liquid film is acted upon by immobilized catalyst layers at the pipe wall or at the distributor rollers or by gases introduced into the interior of the pipe to assist the reaction.

The process and arrangement are used for photochemical cleaning of media containing chlorocarbons, chlorofluorocarbons and fluorocarbons and for preparing drinking water and highly purified water.

20 Claims, 2 Drawing Sheets

1

PROCESS AND ARRANGEMENT FOR CONTINOUSLY CARRYING OUT PHOTOREACTIONS IN A LIQUID PHASE

This is a continuation of application Ser. No. 08/428,111, filed Apr. 28, 1995 now abandoned.

BACKGROUND OF THE INVENTION a) Field of the Invention

The invention is directed to a process and an arrangement for continuously carrying out photoreactions in a liquid phase, in particular for cleaning media containing chlorocarbons, chlorofluorocarbons and fluorocarbons by photochemical means as well as for preparing drinking water and highly purified water.

b) Description of the Related Art

It is well known that photoreactions can be used to convert chemical compounds. In particular, photoreactions are used to remove organic chlorine compounds from waste water (D. Bockelmann and D. Bahnemann, "Referateband der Photochemie GdCH-Fachgruppentagung Photokatalytischer Abbau von halogenierten Kohwenwasserstoffen an Halbleitern" [Papers on photochemistry presented at the German Chemical Society conference on photocatalytic decomposition of halogenated hydrocarbons in semiconductors], Duisburg 1989). The arrangements used for this purpose are characterized by the use of photo-immersion lamps whose efficiency is sharply reduced by the layer thickness and cloudiness of the medium. This disadvantage is especially noticeable when catalysts, particularly titanium dioxide in granulated form, are added to the reaction mixture (M. Bideau, B. Claudel, L. Faure and H. Kazouan; *J Photobiol. A* 67 (1992) 337). This arrangement has two disadvantages. There is a perceptible decrease in the penetration depth of the radiation and accordingly in the space-time yield and the catalyst employed must be separated out after the reaction. At the same time, a separately produced gas must be introduced into the mixture in order to bring the reaction to completion when necessary.

Other apparatus for photoreactions are based on drop film reactors (DE 40 05 488 A1) at which the medium runs down vertically and with indefinite layer thickness. This is also true for giant reactors and reactors in which the medium is sprayed into the reaction chamber through tangentially arranged nozzles (DE 41 11 663 A1), (DE 92 03 187.0 U1).

OBJECT AND SUMMARY OF THE INVENTION

Therefore, the primary object of the present invention is to enable photoreactions to be carried out continuously in a liquid phase in which the quantum yield is increased in particular in cloudy, colored or UV-absorbing liquid media.

According to the invention, in a process for continuously carrying out photoreactions in a liquid phase in which a substance to be converted is distributed on the inner wall of a rotationally symmetrical vessel and is illuminated by a radiation source projecting into the vessel, the object of the invention is met in that the substance is made to drip down the vessel wall due to the orientation of the axis of symmetry of the vessel in the direction of gravitational force, the dripping substance is formed in a uniform thin substance film by distributor elements which are guided substantially continuously along the entire vessel wall, substantially parallel to the vessel wall and at a distance relative to the vessel wall such that this distance does not equal zero at any point, and in that the substance film is exposed by means of a long rod-shaped photolamp of suitable length directly through the gas atmosphere located in the interior region of the vessel at least along the region formed in a uniform manner by the distributor elements.

The substance is preferably rolled smooth at the inner wall of an upright pipe transversely to the pipe by means of rotating distributor rollers so as to form a uniform film, wherein the inner wall is exposed uniformly and directly proceeding from the pipe axis by means of a rod-shaped photolamp. In so doing, the layer thickness of the liquid is advisably adjusted more sensitively by the rotating speed of the distributor rollers. Gases which assist the reaction, e.g., air or oxygen which form ozone due to the intensive illumination, are preferably introduced into the interior of the pipe.

According to the invention, in an arrangement for continuously carrying out photoreactions in a liquid phase having a rotationally symmetrical vessel through which the substance is guided, a radiation source located on the axis of symmetry, and a rotor moved around the axis of symmetry, the object of the invention is met in that the vessel is a vertically upright pipe with an inlet located at the top and an outlet located at the bottom, wherein a substance to be converted runs down the inner wall of the pipe due to gravitational force, the rotor is constructed in the shape of a cage with at least two rods in an orientation parallel to the inner wall of the pipe, distributor rollers being supported on these rods so as to be rotatable, wherein the rods with the distributor rollers are spaced from the inner wall of the pipe in a defined manner so as to leave a space for the formation of a uniform film of the substance to be converted and the radiation source is a rod-shaped photolamp which is arranged centrally along the axis of symmetry for the purpose of a uniform exposure of the substance film which is effected exclusively through the gas atmosphere in the interior of the pipe.

In so doing, it is advantageous to coat the inner wall of the pipe and/or the distributor rollers with a catalyst. The catalyst is advisably applied to surface regions of the distributor rollers having a smaller radius in order to reduce mechanical abrasion of the catalyst layer on the distributor rollers, this radius being reduced at least by an amount corresponding to the mean thickness of the catalyst layer.

The catalyst is preferably a metal oxide of elements belonging to Groups III to V of the periodic system, preferably titanium or niobium, and is advantageously produced on the parent metal by the plasmocer process as described, e.g., in EAST Tagungsbericht 1992, Schwäbisch Gmünd (12/13 Nov. 1992), published August 1993, E. G. Leuze Verlag, SaulgauAWurttemberg, pages 111 to 114.

The basic idea of the invention consists in increasing the efficiency of photoreactions in liquid substances, particularly in cloudy media, by uniform exposure of defined amounts of liquid. According to the invention, this is effected in that a uniform liquid film of defined thickness is produced on a vessel wall by making use of the dripping motion resulting from gravitational force and a wiper movement is superimposed substantially vertically thereto. The process according to the invention is realized in technical respects by a reaction vessel in the form of a pipe with a central rod-shaped photolamp and circulating distributor rollers at the pipe wall.

By means of the technical solution according to the invention, it is possible to achieve a decisive increase in the quantum yield in continuous photoreactions, particularly in cloudy, colored or UV-absorbing liquids. By applying immobilized catalysts and introducing gases into the arrangement according to the invention, it is possible to achieve further increases in the effectiveness of the photoreactions which make the process attractive particularly for use in processing drinking water and producing highly purified water.

The invention will be explained more fully in the following by means of embodiment examples shown in the drawing:

DESCRIPTION OF THE PREFERRED EMBODIMENTS

The essential steps in the process according to the invention consist in that a) the substance in a liquid phase (hereinafter referred to as liquid) which is provided for conversion is dripped down a vertically upright vessel wall due to gravitational force, b) the liquid is uniformly distributed substantially transversely to the dripping direction by means of distributor rollers so as to form a film of optional but constant thickness and c) the liquid film on the vessel wall is exposed simultaneously and uniformly.

In order to illustrate the process, the advantageous arrangement shown in FIG. 1 will be described first and the process will then be shown in special examples.

Figure 1:
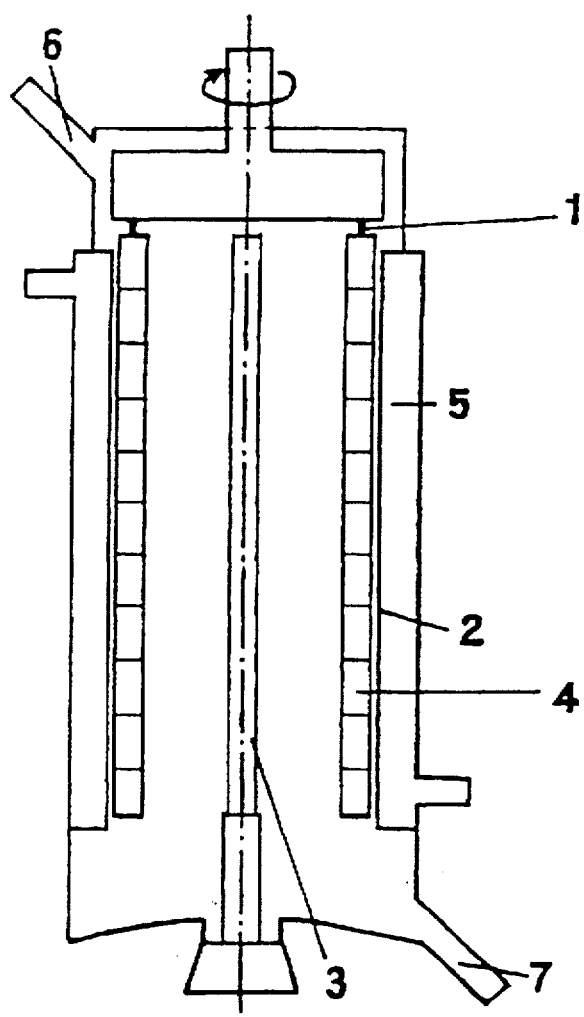
FIG. 1 shows an arrangement according to the invention for realizing the process.

As will be seen from FIG. 1, the arrangement has a pipe 2 which is formed in the present instance by the interior wall of a double-walled vessel 5 and has an inner diameter of 75 mm and a length of approximately 200 mm. The substance to be converted drips down the inner wall of the pipe. There is an inlet 6 at the top and an outlet 7 at the bottom. By means of a plurality (at least two, optimally three or four) rods 1 which move on a circular path parallel to the interior wall of the pipe 2 and have distributor elements, preferably distributor rollers 4 with a diameter of 12 mm, the liquid dripping down as a result of gravitational force is wiped along the interior wall of the pipe 2 tangentially, i.e., vertically to the direction of gravitational force, in such a way that a uniform film with a thickness of less than 1 mm remains on the pipe wall. Depending on the rotating speed (between 60 and 2000 $min^{-1}$) of the cage-like rotor on which the rods I are arranged symmetrically, a layer thickness between 0.5 and 0.01 mm can be produced and maintained by the distributor rollers 4. The maximum orbital diameter of the rotor, including the distributor rollers 4, occurring as a result of centrifugal forces must be slightly smaller than the inner diameter of the pipe 2. The viscosity of the liquid must also be taken into account to determine the difference in diameters.

Figure 2:
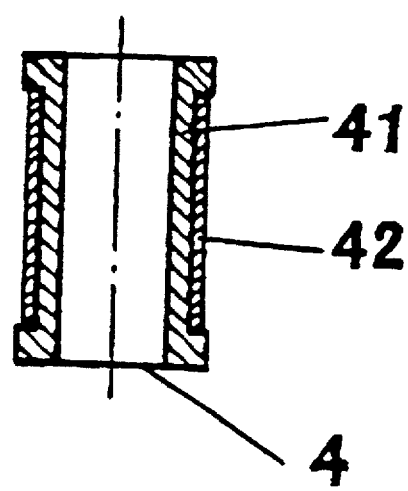
FIG. 2 shows an enlarged detail from FIG. 1 in the form of a wiper roller 4 coated with a catalyst.

The rod-shaped photolamp 3 (preferably having an operating wavelength range of 120 to 480 nm) is located in the center of the pipe 2 so as to be separated by a gas atmosphere, preferably air. An appropriate catalyst is immobilized on the inner wall of the pipe 2 (with 442 $cm^2$ surface area) and on the distributor rollers 4 rotating on the rods 1 (with 198 $cm^2$ surface area). The distributor rollers 4 and/or the pipe 2 itself are produced from the catalyst when appropriate. This arrangement ensures that a defined thin layer of the substance to be converted is always in contact with the catalyst and that the irradiation achieves maximum efficiency. In order to reduce the mechanical wear of the catalyst layer if applied to the distributor rollers 4, it is advisable to design the distributor rollers 4 corresponding to the cross section shown as a detail in FIG. 2. For this purpose, the wiper roller 4 has surface regions which are reduced in radius compared to the normal radius at least by an amount corresponding to the mean thickness of the catalyst layer 42. Provided that the distributor rollers 4 are manufactured from a metal belonging to Groups III to V of the periodic table, preferably titanium, zirconium or niobium, the catalyst can be produced on the parent metal 41 as a homogeneous and uniform oxide layer, e.g., by the plasmocer process mentioned above.

It is also possible to arrange an atomizing device upstream in the described arrangement in order to introduce liquid-gas mixtures into the reactional chamber or to meter additional reagents (hydrogen peroxide or peroxide sulfate). The residence time of the medium in the pipe 2 can be varied by the rotating speed of the rotor with the distributor rollers 4.

The construction of the pipe 2 as a double-walled vessel, already mentioned, also permits the arrangement to be tempered.

Further, it is also possible to introduce different gases into the interior of the pipe 2, such as argon as protective gas or air as oxidizing agent. Operation with protective gas requires the use of oxidizing reagents. Additionally increased degrees of purity of the liquid can be achieved by providing a row of such reactor vessels (cascade connection).

The arrangement makes it possible to utilize photoreactions taking place in the gas phase in that the formed product, e.g., ozone, can be reacted directly with the liquid and the gas phase is intimately mixed with the liquid due to the action of the distributor rollers 4.

Some examples for conversion of the process are presented in the following:

EXAMPLE 1

An aqueous medium (1 liter) comprising a halogenated compound, preferably trichloroethylene, in a maximum concentration of $2.8 \cdot 10^{-3}$ mol/l with addition of 2% hydrogen peroxide is converted within a period of 30 min in the arrangement described above. Distributor rollers 4 comprising a titanium oxide layer on titanium sheet metal produced by the PLASMOCER process are used as catalyst. No organic halogen compound could be found in the product.

EXAMPLE 2

An aqueous medium (1 liter) comprising a halogenated compound in the form of fluorinated aromatics, preferably difluorobenzene, in a maximum concentration of $3 \cdot 10^{-3}$ mol/l with addition of 2% hydrogen peroxide is converted within a period of 30 min in the arrangement described above. Distributor rollers 4 corresponding to those used in Example 1 are used as catalyst. No organic halogen compound could be found in the product.

EXAMPLE 3

An aqueous medium (0.5 l) comprising a halogenated compound, preferably trichloroethylene, in a maximum concentration of $2 \cdot 10^{-3}$ mol/l without addition of hydrogen peroxide is converted within a period of 30 min in the arrangement described above. Distributor rollers 4 corresponding to those used in Example 1 are used as catalyst. No organic halogen compound could be found in the product.

EXAMPLE 4

An aqueous medium (0.5 l) comprising a halogenated compound in the form of fluorinated aromatics, preferably difluorobenzene or fluorophenol, in a maximum concentration of $2 \cdot 10^{-3}$ mol/l without addition of hydrogen peroxide is converted within a period of 30 min in the arrangement described above. No organic halogen compound could be found in the product.

While the foregoing description and drawings represent the preferred embodiments of the present invention, it will be obvious to those skilled in the art that various changes and modifications may be made therein without departing from the true spirit and scope of the present invention.

What is claimed is:

1. A process for continuously carrying out photoreactions in a liquid phase in which a substance to be reacted is distributed on an inner wall of a rotationally symmetrical vessel, comprising the steps of:

allowing the substance to drip down the vessel wall;

forming the dripping substance into a substance film by distributor elements which are guided substantially continuously along the entire vessel wall, oriented substantially parallel to the vessel wall, and maintained at a distance spaced from the vessel wall; and illuminating the substance film by a radiation source located in the interior region of the vessel.

2. The process according to claim 1 wherein the distributor elements are rollers oriented substantially parallel to the vessel wall, the step of forming a substance film including the step of rolling the distributor rollers along the inner vessel wall.

3. The process according to claim 2 wherein said radiation source is an elongated photolamp positioned along the symmetric axis of the vessel.

4. The process according to claim 2, including the step of controlling the thickness of the substance film by selecting the rotating speed of a rotor, the distributor rollers being rotatably supported on the rotor.

5. The process according to claim 1, including the step of introducing to the vessel a gas selected from the group consisting of air, oxygen, and ozone.

6. The process according to claim 5, wherein a gaseous product is formed by the gas under illumination from said radiation source, further including the step of allowing the gaseous product to react directly with the substance due to the mixing of liquid and gaseous phases.

7. The process according to claim 2, further comprising the step of catalyzing the conversion of the substance by a catalyst located on a parent metal in the vessel.

8. The process according to claim 7 wherein said parent metal is located on the distributer rollers.

9. The process according to claim 7 wherein said parent metal is located on the vessel wall.

10. The process according to claim 7, wherein the catalyst includes a metal oxide of an element belonging to one of Groups IIIB, IVB, and VB of the periodic table.

11. The arrangement according to claim 8 wherein said metal oxide is a metal oxide of titanium, zirconium or niobium.

12. The process according to claim 11, wherein the distributor rollers include a layer of a parent metal, including the step of immobilizing the catalyst by producing an oxide layer on the parent metal by anodic spark deposition.

13. An arrangement for continuously carrying out photoreactions in a liquid phase comprising:

a rotationally symmetrical vessel having an axis of symmetry oriented substantially vertically, said vessel having an inlet located at an upper end and an outlet at a lower end thereof, such that a liquid substance entering said vessel at said inlet runs down an inner wall of said vessel due to gravitational force;

a rotor rotatable around said axis of symmetry, said rotor including at least two rods in an orientation parallel to the inner wall of said vessel and distributor rollers rotatably supported on said rods, said distributor rollers being spaced from the inner wall of said vessel; and a radiation source positioned along said axis of symmetry, said radiation source being an elongated photolamp.

14. The arrangement according to claim 13, wherein a catalyst is disposed in the interior of said vessel.

15. The arrangement according to claim 14, wherein the inner wall of vessel is coated with said catalyst.

16. The arrangement according to claim 14, wherein said catalyst includes a metal oxide of an element belonging to one of Groups IIIB, IVB, and VB of the periodic table.

17. The arrangement according to claim 14, wherein said distributor rollers are coated with said catalyst.

18. The arrangement according to claim 17, wherein said rollers include a first surface region having a first radius and a second surface region having a second radius smaller than said first radius, said catalyst being applied to said distributor rollers on said second surface regions, said catalyst forming a layer having a thickness no greater than the difference between said first radius and said second radius.

19. The arrangement according to claim 18 wherein said catalyst is an oxide layer produced by anodic spark deposition.

20. The arrangement according to claim 19 wherein said metal oxide is a metal oxide of titanium, zirconium or niobium.

* * * * *